United States Patent
Pedrono et al.

[11] Patent Number: 6,116,734
[45] Date of Patent: Sep. 12, 2000

[54] OPHTHALMIC LENS

[75] Inventors: Claude Pedrono, Briis-Sous-Forges; Christian Harsigny, Yerres; Catherine Fauquier, Champigny sur Marne; Fanny Jurkiewiez, Noiseau; Eric Roland, Savigny le Temple, all of France

[73] Assignee: Essilor International, Charenton Cedex, France

[21] Appl. No.: 09/130,537

[22] Filed: Aug. 5, 1998

[30] Foreign Application Priority Data

Oct. 16, 1997 [FR] France ................. 97 12987

[51] Int. Cl.[7] .................. G02C 7/02; G02C 7/06
[52] U.S. Cl. ............. 351/159; 351/168; 351/169
[58] Field of Search .................. 351/168, 169, 351/170, 171, 172, 159

[56] References Cited

U.S. PATENT DOCUMENTS

| | | | |
|---|---|---|---|
| 4,854,689 | 8/1989 | Dufour et al. | 351/169 |
| 5,270,745 | 12/1993 | Pedrono | 351/169 |
| 5,488,442 | 1/1996 | Harsigny et al. | 351/169 |
| 5,719,658 | 2/1998 | Ahsbahs et al. | 351/169 |

OTHER PUBLICATIONS

Guilino, Applied Optics, "Design Philosophy for Progressive Addition Lenses", 32:1:111–117, Jan. 1, 1993.
"Essilor Delta: Lenses for the Proximal Field Too," Opticien Lunetier, Apr. 1988. (Translation attached).

*Primary Examiner*—Georgia Epps
*Assistant Examiner*—Jordan M. Schwartz
*Attorney, Agent, or Firm*—Fish & Richardson P.C.

[57] ABSTRACT

An ophthalmic lens with an aspherical face is provided having a near vision region which is larger in size and wider than that of conventional multifocal lenses, and having reduced aberrations and, notably, astigmatism. Using $\Delta$ to signify a difference in mean sphere between the near vision control point and the geometrical center of the lens, this is achieved by making a surface area defined by points less than 20 mm from the geometrical center of the lens, and for which cylinder is comprised between $0.42\Delta$ and $0.84\Delta$ greater than the surface area defined by points less than 20 mm from the geometrical center, and for which cylinder is less than $0.42\Delta$.

18 Claims, 4 Drawing Sheets

OPHTHALMIC LENS

BACKGROUND OF THE INVENTION

The present invention relates to ophthalmic lenses.

Multifocal progressive lenses are now well known. They are used for correcting long-sightedness and enable the spectacle wearer to observe object over a wide range of distances without removing the spectacles. Such lenses typically include a far vision region situated in the upper portion of the lens, a near vision region situated at the bottom of the lens, an intermediate region linking the near and far vision regions, as well as a main meridian of progression which passes through these three regions. French patent application FR-A-2,699,294 discusses, in its preamble, the various elements of such a multifocal progressive ophthalmic lens along with the work carried out by the applicant to improve comfort of wearers of such lenses. This document should be consulted for more information on these various points.

Wearers generally have difficulties in adapting to progressive lenses. Because of this, a certain number of long-sighted people for whom such progressive lenses could be prescribed, do not adopt them. This notably concerns young long-sighted people with no ametropia, or long-sighted people with only slight ametropia. Such wearers will be satisfied with single-focus lenses or bifocals. These solutions are not satisfactory as they do not provide correction for intermediate vision, and are not aesthetic.

A lens has been proposed (see article in the "*Opticien Lunetier*" dated April 1988), sold commercially by the applicant under the Essilor Delta trademark; this lens is also as simple to use and easy to wear as a progressive lens, and it is attractive to long-sighted people not fitted with progressive lenses. This lens is also described in French patent application 2,588,973. It has a central portion which is equivalent to the single-focus lens that would normally have been employed for correcting long sightedness, in order to ensure satisfactory near vision. It additionally has a slight decrease in power in the upper portion, ensuring that the wearer also has sharp vision beyond the usual near vision field. Finally, the lens has a point at a power value equal to the nominal power for near vision, a higher power region at the lower portion of the lens, and a lower powered region in the top portion of the lens.

This lens suffers from disadvantages; it causes problems with dynamic vision resulting from a too high power in close vision and a too low power in intermediate vision, for the mounting instructions envisaged. In peripheral vision, the lens has significant astigmatism; the region of progression between the central portion and the upper portion is of reduced width.

SUMMARY OF THE INVENTION

The invention sets out to propose a solution to these problems. It provides a lens which is adapted to be better tolerated than conventional ophthalmic lenses and is easier to prescribe. It allows a wearer to benefit from the advantages of a single-focus lens in near vision, with, additionally, intermediate vision.

The invention provides wearers with a near vision region which is stabilized and larger in size, a significant increase in the width of the near vision field and in the upper portion of the lens in intermediate vision, as well as a reduction in aberrations and, notably, of astigmatism. It provides appropriate correction for distances between 40 and 80 cm and, in a majority of cases, for distances between 40 cm and 2 m. The invention thus provides a solution that is quite suitable for everyday use by computer users.

More precisely, the invention provides an ophthalmic lens with an aspherical face, having a geometrical center, a near vision reference point and at every point a value of mean sphere and a value of cylinder, a substantially umbilical vertical meridian, and in which a surface area defined by points at a distance from a geometrical center of said lens less than 20 mm, and for which a value of cylinder is comprised between a first value and a second value, is larger than a surface area defined by points at a distance of less than 20 mm from said geometrical center, and for which a value of cylinder is less than said first value, said first value being equal to the product obtained by multiplying a constant substantially equal to 0.42 by the difference $\Delta$ in mean sphere between a close vision control point and said geometrical center of the lens, said second value being equal to the product obtained by multiplying a constant substantially equal to 0.84 by the difference $\Delta$ in mean sphere between a close vision reference point and said geometrical center of said lens.

In one embodiment, a surface area defined by points at a distance of less than 20 mm from said geometrical center and for which cylinder is greater than said second value, is a surface area making up less than ½0th of a surface area formed by points for which their distance from said geometrical center is less than 20 mm.

Advantageously, for points of said meridian having a y-axis coordinate, or vertical distance with respect to said geometrical center of the lens, comprised between −20 mm and +20 mm, cylinder has a value of less than 0.12 diopter.

Mean sphere is preferably a decreasing function of y-axis coordinate on at least one vertical line of said lens, above a close vision reference point and in particular, for a vertical line passing through an optical center of said lens.

In one embodiment, a surface area defined by points having a distance from said geometrical center of less than 20 mm and for which a value of cylinder is comprised between said first and second values, is greater than 800 $mm^2$ when a difference $\Delta$ in mean sphere between said close vision reference point and said geometrical center of the lens is of the order of 0.60 diopter.

In another embodiment, the close vision reference point is located on said lens at less than 11 mm below said geometrical center of the lens and, preferably, at 10 mm below said geometrical center of the lens.

Advantageously, a surface area S defined by points having a distance of less than 20 mm from said geometrical center and for which a value of cylinder is comprised between said first and second values, is comprised between 780 and 880 $mm^2$.

Preferably, within a 8 mm diameter circle centered on said close vision reference point, cylinder at every point is less than 0.37 diopters.

Provision can also be made so that, within a 8 mm diameter circle centered on said close vision reference point, variation in mean sphere is less than 0.25 diopters.

In one embodiment, an absolute value of gradient of mean sphere on said aspherical surface is less than the product of multiplying a constant $k_s$ by a difference $\Delta$ in mean sphere between said close vision reference point and said geometrical center of the lens, the value of said constant $k_s$ being comprised between 0.10 and 0.15 $mm^{-1}$ and is preferably equal to 0.14 $mm^{-1}$.

In another embodiment, an absolute value of gradient of cylinder on said aspherical surface is less than a product of multiplying a constant $k_c$ by a difference $\Delta$ in mean sphere between said close vision reference point and said geometrical center of the lens, said constant $k_c$ having a value comprised between 0.18 and 0.22 $mm^{-1}$ and preferably has a value of 0.21 $mm^{-1}$.

Points of said aspherical face situated at a distance of less than 20 mm from said geometrical center and which are below a horizontal line situated 4 mm below said geometrical center of the lens preferably have a cylinder that is less than said second value.

Lines defined by points on said aspherical face having a y-axis coordinate or vertical distance from said geometrical center of the lens greater than 8 mm, and for which cylinder is equal to said first value, are advantageously substantially parallel, and are preferably vertical.

Other characteristics and advantages of the invention will become more clear from the description which follows of various embodiments provided by way of example and with reference to the attached drawings.

DETAILED DESCRIPTION OF PREFERRED EMBODIMENTS

In the remainder of this description, we shall use a system of Cartesian coordinates on the surface of the lens, with an orthonormal reference frame; the x-axis is formed by the horizontal passing through the geometrical center of the lens and the y-axis is formed by the vertical passing through the geometrical center of the lens, and is oriented upwardly.

As known per se, for every point on the aspherical surface, a mean sphere D is defined from the formula:

$$D = \frac{n-1}{2}\left(\frac{1}{R_1} + \frac{1}{R_2}\right)$$

in which:

$R_1$ and $R_2$ are the maximum and minimum radii of curvature expressed in meters, and n is the refractive index of the lens material.

Cylinder C is defined by the formula:

$$C = (n-1)\left|\frac{1}{R_1} - \frac{1}{R_2}\right|$$
$$= (n-1) \cdot |C_1 - C_2|$$

where $C_1$ and $C_2$ are the maximum and minimum curvatures, in diopters.

The invention provides an ophthalmic lens designed to be mounted in a spectacle frame, and of which the aspherical front surface has the characteristics described below.

Figure 1:
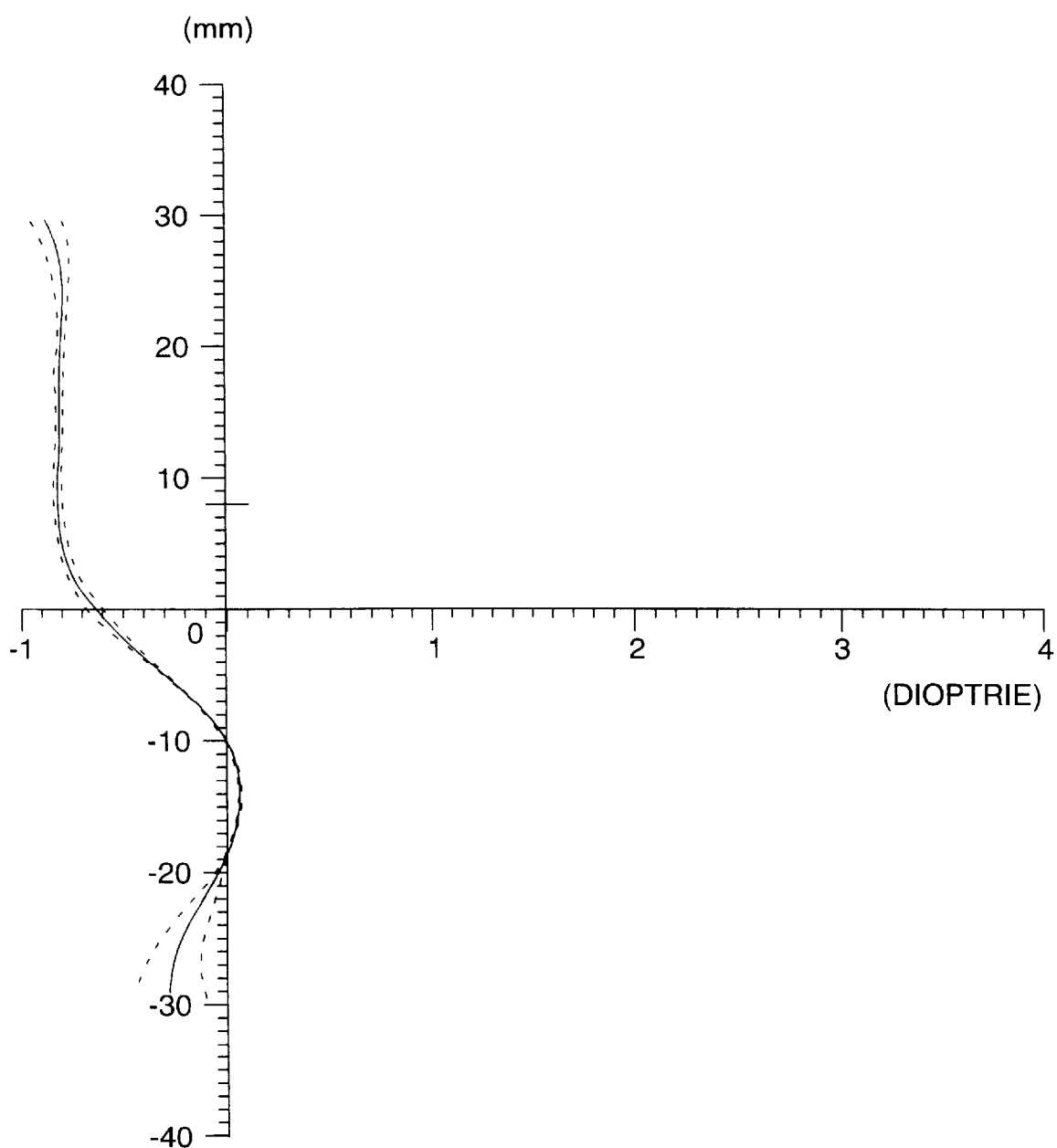
FIG. 1 is a graph showing various surface parameters along the y-axis of a lens according to the invention.

FIG. 1 is a graph of various surface parameters along the y-axis of a lens according to the invention; FIG. 1 shows, as a function of the value on the y-axis of the lens, which is the y-axis in FIG. 1, mean sphere in a solid line and minimum and maximum curvatures $C_1$ and $C_2$ in dashed lines. The x-axis of FIG. 1 is graduated in diopters and normalized in order to obtain, for the graphical representation of FIG. 1, a value of 0 for mean sphere at the near vision control or reference point.

In one embodiment of the invention, the y-axis constitutes a substantially umbilical line, with low cylinder. In the embodiment of FIG. 1, cylinder is less than 0.12 diopters for values on the y-axis between −20 mm and +20 mm. This line thus constitutes a substantially umbilical line, in other words a meridian; this meridian has the property of being vertical. It is not necessary for the lens according to the invention, to define, as it was in the prior art, a main meridian of progression having a complex shape. It is sufficient to use such a vertical meridian the values of mean sphere for which are shown in FIG. 1.

In one advantageous embodiment of the invention, for setting the power needed in close vision, a near vision control point Vp is employed on the lens, situated higher up than in a conventional progressive lens. A y-axis value greater than −11 mm, for example of the order of −10 mm, can be employed. This has the effect of reducing downward eye movements, making the lens more comfortable to use when working at a computer screen, by limiting movements between the screen, the keyboard and documents.

In the lens of FIG. 1, mean sphere at the near vision control point is 5.57 diopters, and cylinder is 0.01 diopters.

The invention provides a decrease in mean sphere towards the top of the lens, in other words for wide-axis values greater than that of the near vision control point. Thus, for a given value on the x-axis, and notably for the value x=0, corresponding to the meridian, mean sphere decreases as y-axis values increase.

A decrease Δ in mean sphere between the point $V_P$ and the geometrical center of the lens of the order of 0.60 diopters can be chosen, and an overall decrease Θ in mean sphere on the meridian of the lens of the order of 0.80 diopters, with respect to the near vision control point. The range of preferred values for the decrease Δ in mean sphere between the near vision control point and the geometrical center of the lens is [0.50; 1.20], in diopters. The range of preferred values for the overall decrease Θ in mean sphere, between the point $V_P$ and any point on the meridian is [0.70; 1.60], in diopters. The currently preferred pair of values (Δ, Θ) are (0.60; 0.80) and 0.95; 1.30), in diopters.

It can been noticed on FIG. 1 that mean sphere is substantially constant at the upper portion of the lens, in other words for positive y-axis values. In this region, mean sphere does not vary by more than 0.30 diopters. Mean sphere varies regularly for y-axis values comprised between 0 and −10 mm; below this y-axis value, mean sphere has a substantially constant value. One thus provides the presence of a region around point $V_P$ in which close vision is satisfactory and, beyond this region, a decrease in mean sphere is provided.

Figure 2:
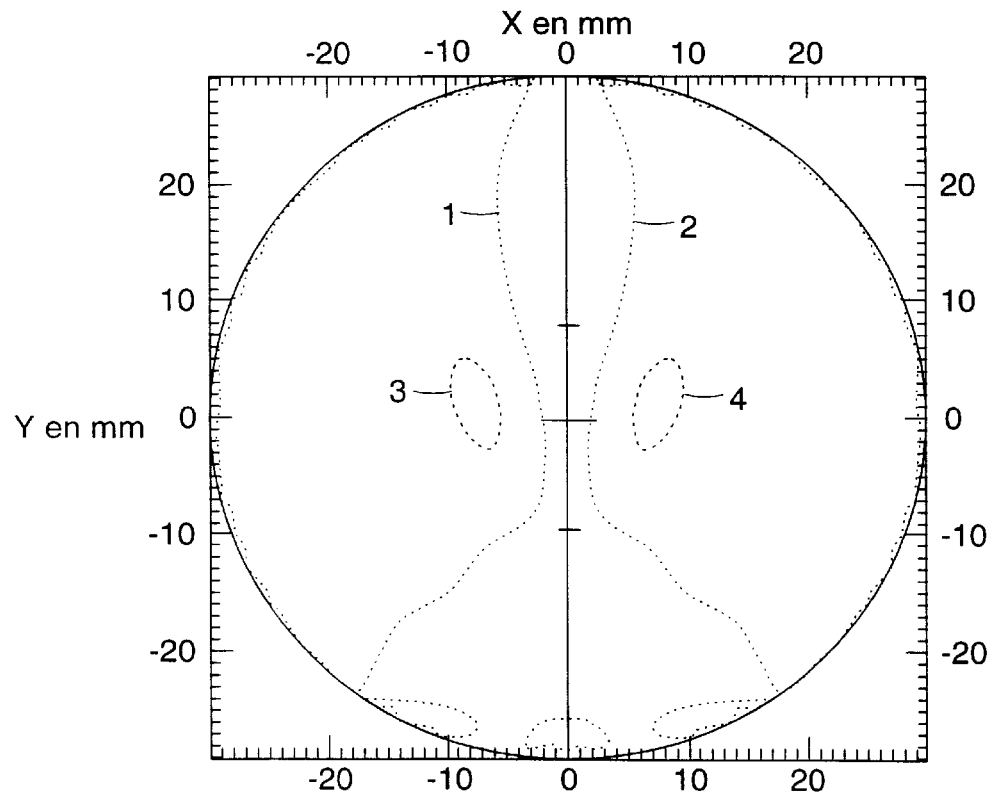
FIG. 2 shows graphically isocylinder lines on the surface of the lens according to the invention.

FIG. 2 is a graphical representation showing isocylinder lines on the surface of the lens of the invention, i.e. lines constituted from the set of points that all have the same cylinder; on FIG. 2, the dotted lines 1 and 2 represent 0.25 diopter isocylinder lines and the dashed lines 3 and 4, 0.5 diopter isocylinder lines.

In the upper portion of the lens, the 0.25 diopter isocylinder lines are substantially parallel and vertical, i.e. parallel to the x-axis or to the meridian. Thus, in the example of FIG. 2, the lines 1 and 2 have an x-axis value comprised respectively in the ranges [−6, −4] and [4, 6] mm, for all values of y greater than 8 mm, for a 40 mm lens diameter.

The 0.50 diopter isocylinder lines enclose surfaces where cylinder is greater than 0.5 diopters, these being close to the x-axis on both sides of the y-axis. The distance between these isocylinder lines, close to the geometrical center of the lens, substantially corresponds to the intermediate vision region which is wider than in a conventional progressive lens.

The invention proposes accepting the region comprised between the 0.25 diopter isocylinder lines, at least in the upper portion of the lens, to be relatively reduced compared to conventional lenses; this can be for example done by providing parallel isocylinder lines, as described above. This makes it possible to minimise constraints on the lens surface and provide a larger surface where isocylinder is less than 0.50 diopters than in the case of known lenses, and covering practically the whole surface of the lens. The lens of the invention thus has a large surface of vision, and a gentleness of progression both of which render it easier to accept. Quantitatively, this characteristic is reflected by a surface area comprised between the 0.25 and 0.50 isocylinder lines of the order of 830 mm² for a 40 mm diameter lens, and for a total decrease in mean sphere of 0.80 diopters. Considering the decrease $\Delta$ in mean sphere between the point $V_P$ and the geometrical center of the lens, the surface area between the lines of 0.42 $\Delta$ and 0.84$\Delta$ isocylinder is comprised in the range 780 to 880 mm², for values of $\Delta$ between 0.50 and 1.20 diopters.

It will additionally be noticed on FIG. 2 that points for which cylinder is greater than 0.50 diopters are situated on the upper portion of the lens, above a horizontal straight line. More precisely, points where cylinder is greater than 0.50 are above a line obeying the equation y=−4 mm. Additionally, those points having cylinder above 0.50 diopter, or more generally 0.84 $\Delta$, constitute a surface less than a maximum value, for a lens diameter of 40 mm. This surface area corresponds to less than ½oth of the total surface area of the lens.

For a lens such as the one in FIG. 2, which has a decrease $\Delta$ of 0.60 diopter, and an overall decrease $\Theta$ in mean sphere on the meridian of 0.80 diopters with respect to the near vision control point, the invention thus provides in relative terms, that the surface area of the lens between the 0.25 and 0.50 diopter isocylinder lines be larger than the area delimited by the 0.25 diopter isocylinder lines, and be formed of points where cylinder is less than 0.25 diopters. This characteristic is clearly in contradiction with the teachings of the prior art, and notably with current practice in the field of progressive lenses.

More generally, the invention proposes that the surface area of the lens between, firstly, a 0.42 $\Delta$ or 0.31 $\Theta$ isocylinder line and, secondly, a 0.84$\Delta$ or 0.62 $\Theta$ isocylinder line be larger than the surface area delimited by the 0.42$\Delta$ or 0.31$\Theta$ isocylinder lines, and be formed by points where cylinder is less than 0.42$\Delta$ or 0.31 $\Theta$ diopters.

The invention also makes it possible to obtain very gentle progression which is reflected by small values of slope or gradient of sphere and cylinder. The gradient or maximum slope of cylinder in the lens of FIG. 1 is 0.125 diopter/mm. It is thus less than 0.15, preferably less than 0.13 diopters/mm. The gradient or maximum slope of sphere in the lens of FIG. 1 is 0.065 diopter/mm; it is thus less than 0.1 and preferably 0.07 diopter/mm.

Additionally, it is advantageous when the absolute value of gradient of mean sphere of the aspherical surface is less than the product $k_s.\Delta$ obtained by multiplying a constant $k_s$ by the difference $\Delta$ in mean sphere between the close vision reference point and the geometrical center of the lens. The constant $k_s$ can have a value comprised between 0.10 and 0.15 mm$_{-1}$, and can for example be substantially equal to 0.14 mm$_{-1}$.

Provision can also be made for the absolute value of gradient of the cylinder of the aspherical surface to be less than the product $k_c.\Delta$ obtained by multiplying a constant $k_c$ by the difference $\Delta$ in mean sphere between the close vision reference point and the geometrical center of the lens. The value of $k_c$ can be comprised between 0.18 and 0.22 mm$_{-1}$ and can for example be substantially 0.21 mm$_{-1}$.

Figure 3:
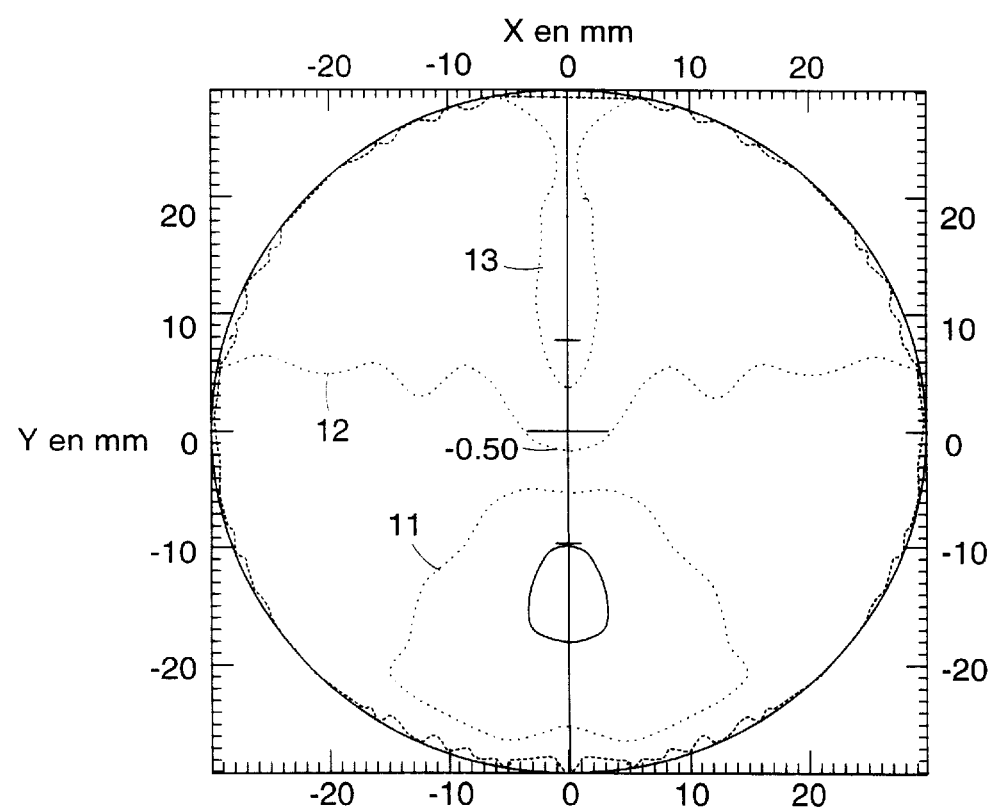
FIG. 3 shows graphically lines of mean sphere on the surface of the lens according to the invention.

FIG. 3 shows graphically isosphere lines on the surface of the lens of the invention, i.e. a graphical representation of the lines that are constituted by the set of points having the same mean sphere, normalised with respect to the point $V_P$; on FIG. 3, the dotted line 11 represents a 0.25 diopter isosphere, i.e. the line joining points where mean sphere is less by 0.25 diopters than that of point $V_P$. In the upper portion of the lens, the dashed line 12 shows points where isocylinder is 0.5 diopters, the dotted line 13 indicating the 0.75 diopter isocylinder line.

It will be noted that the 0.5 diopter isosphere line is, for points on the surface located at more than 10 mm from the geometrical center of the lens, asymptotic with a straight line located above the geometrical center of the lens. Quantitatively, the distance between the points on line 11 and the straight line representing y=4.5 mm is less than 2 mm when distance from the geometrical center is greater than 10 mm.

Figure 4:
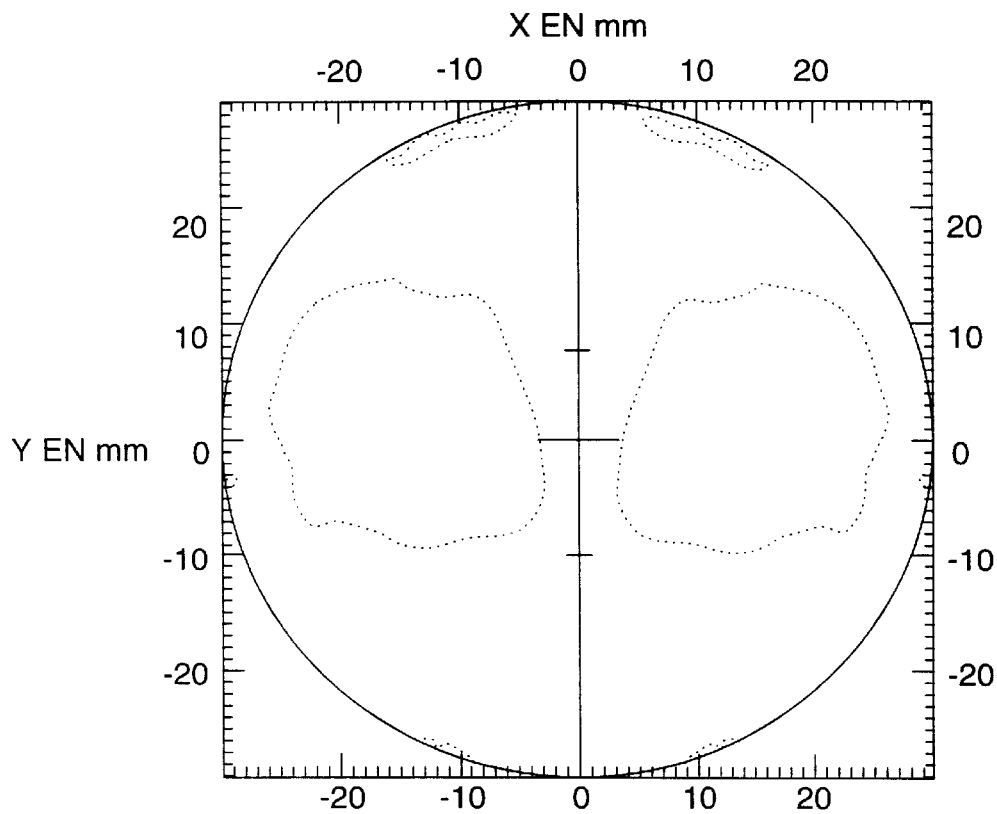
FIG. 4 shows graphically other isocylinder lines on the surface of the lens according to the invention.

In the lower portion of the lens, corresponding to close vision, a close vision region exists in which variation in sphere is less than 0.25 diopters, and in which cylinder is less than 0.37 diopters as can be seen on FIG. 4. This region, in which mean sphere is stabilized ensures satisfactory close vision, and has a surface which is larger than the surface of a circle of diameter greater than 8 mm, centered on the near vision control point at y-axis coordinate y=−10 mm.

The size of this near vision region ensures good lateral vision, and notably makes it possible to read a document situated to the side of the spectacle wearer. This is also made possible by the shape of the isocylinder lines in the upper portion of the lens.

FIG. 4 shows, in a similar manner to FIG. 2, a graphical representation of other isocylinder lines on the surface of the lens according to the invention; FIG. 4 shows 0.37 diopter isocylinder lines. On FIG. 4, one will recognize the region centered on the near vision control point and having cylinder less than 0.37 diopters.

Figure 5:
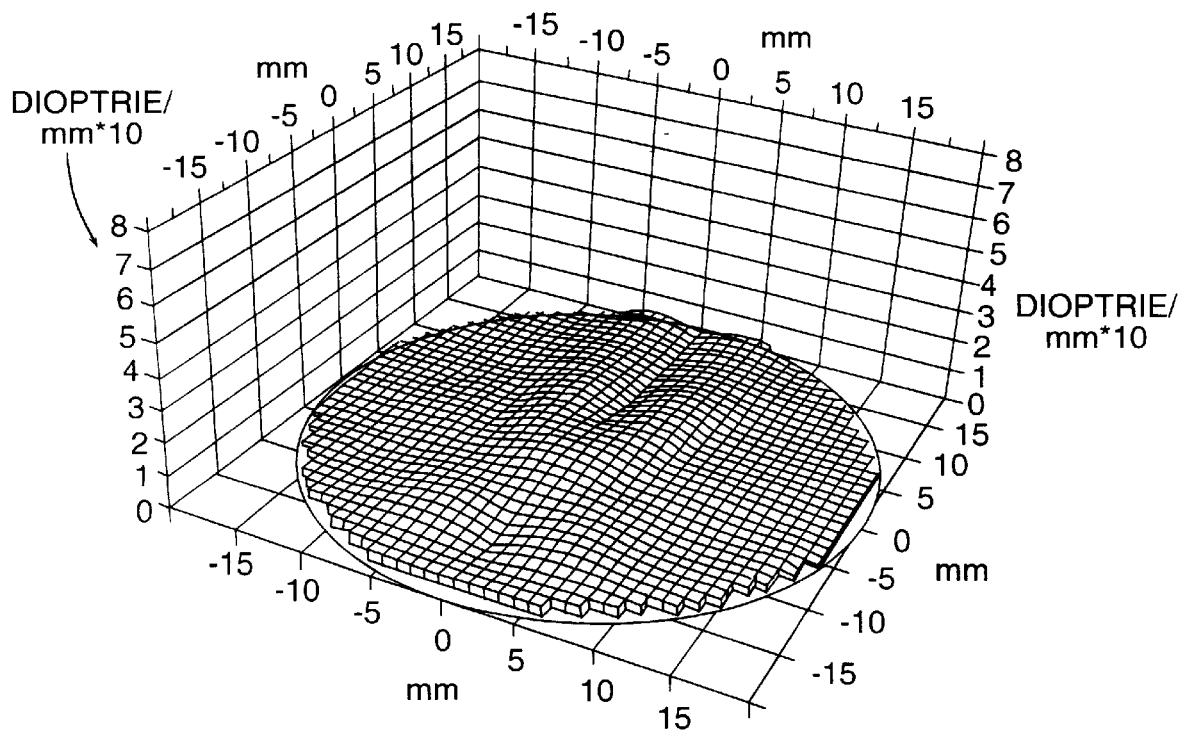
FIG. 5 is a three-dimensional view of the slopes of sphere over the surface of the lens according to the invention.
Figure 6:
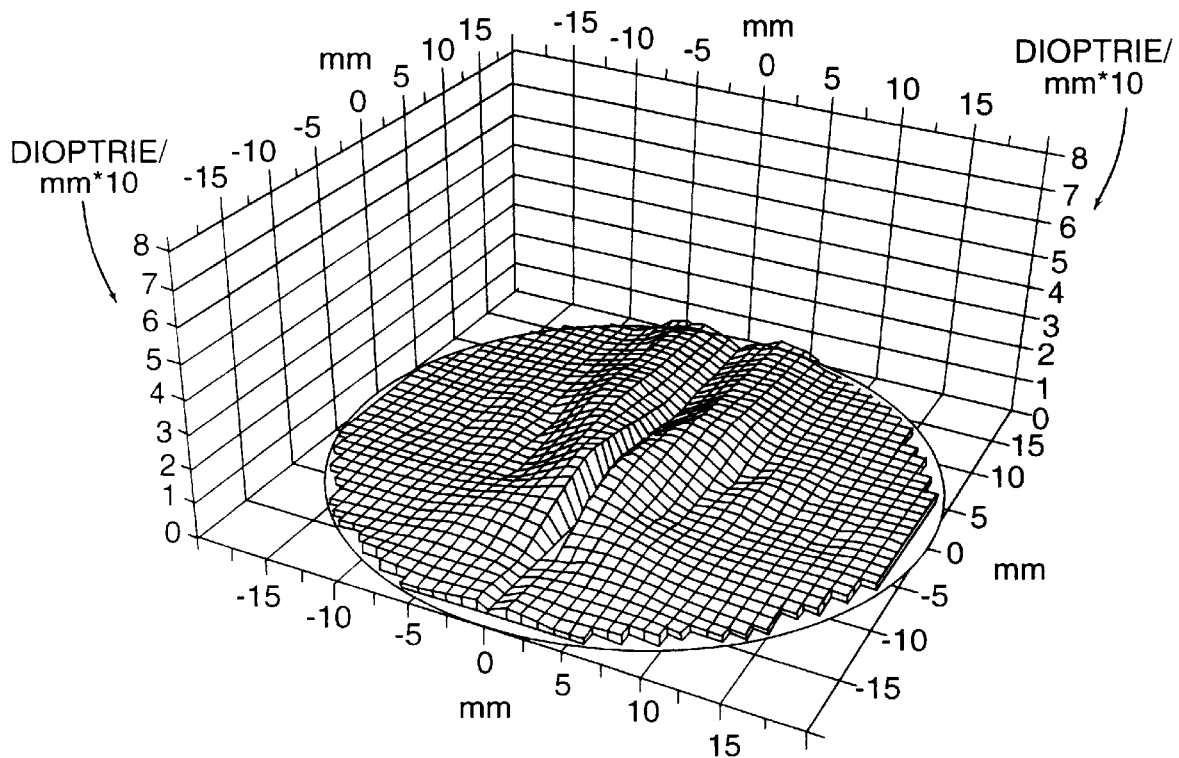
FIG. 6 is a three-dimensional view of slopes of cylinder over the surface of the lens according to the invention.

FIGS. 5 and 6 respectively show a three-dimensional representation of slope of sphere and slope of cylinder on the surface of the lens according to the invention. The limits mentioned above will be recognized on these figures.

The lens of the invention does not constitute a progressive ophthalmic lens in the conventional sense of this term. The invention does not propose a family of lenses each defined by a combination of a base plus a power addition. On the contrary, in order to cover all possible prescriptions, it is sufficient to provide one singe aspherical surface or even two.

When two aspherical surfaces are provided, one can have a decrease $\Theta$ or a value $\Delta$ of the order of 0.80 or 0.60 diopters, and the other a decrease $\Theta$ or a value $\Delta$ of the order of 1.30 or 0.95 diopters. Using simply two surfaces of this type, one can cover all requirements of spectacle wearers, much better than through prior art solutions.

The prescription of lenses according to the invention is not necessarily carried out in the same way as for conventional progressive lenses considering that a family of lenses having differing power additions is not defined. It suffices to determine what optical power is needed for close vision and then to machine the rear face of the lens in order to provide this optical power at the near vision control point. Optical power for intermediate vision is then fixed. The lens does not, strictly speaking, have a far vision region which would be adapted to power for each wearer.

Nor is it essential, in the case of the lens according to the invention, to provide for rotation of the lens at the time of mounting, as applied to earlier straight meridian progressive lenses. It is sufficient to mount the lens of the invention arranging the y-axis vertically. The lens can be mounted in a conventional spectacle frame or, yet again, in a half-moon mounting. In the latter case this allows, when compared to the equivalent mount for a single focussed lens, to decrease the "jump" in the viewer's perception when his view passes over the top edge of the lens.

The lens of the invention ensures correct close and intermediate vision, in a range of vision comprised between 40 and 80 cm and, in the majority of cases between 40 cm and 2 m, thereby covering the environment needed for working at a computer and in particular on the screen, keyboard and a document. The lens does not strictly speaking provide a well-defined far vision region like in the case of conventional ophthalmic lenses. It nevertheless suffices to meet the need of all long-sighted people working at computer, without imposing the learning needed for progressive lenses.

Obviously, the present invention is not limited to the examples and the embodiments described and shown but may be subject to numerous variations available to those skilled in the art. One could thus employ an aspherical rear face and machine the front face, as is done conventionally.

It is also clear that the invention is not limited to the preferred embodiment, and that it is possible to have the decrease in mean sphere vary over the aspherical surface, or to use more than two aspherical faces.

What is claimed is:

1. An ophthalmic lens with an aspherical face, having a near vision correction region, a geometrical center, a near vision reference point and at every point a value of mean sphere and a value of cylinder, a substantially umbilical vertical meridian, and in which a surface area defined by points at a distance from a geometrical center of said lens less than 20 mm, and for which a value of cylinder is comprised between a first value and a second value, is larger than a surface area defined by points at a distance of less than 20 mm from said geometrical center, and for which a value of cylinder is less than said first value, said first value being equal to the product obtained by multiplying a constant substantially equal to 0.42 by the difference $\Delta$ in mean sphere between said near vision reference point and said geometrical center of the lens, said second value being equal to the product obtained by multiplying a constant substantially equal to 0.84 by the difference $\Delta$ in mean sphere between said near vision reference point and said geometrical center of said lens.

2. The ophthalmic lens according to claim 1, wherein a surface area defined by points at a distance of less than 20 mm from said geometrical center and for which cylinder is greater than said second value, is a surface area making up less than 1/20th of a surface area formed by points for which their distance from said geometrical center is less than 20 mm.

3. The ophthalmic lens according to claim 1, wherein, for points of said meridian having a y-axis coordinate, or vertical distance with respect to said geometrical center of the lens, comprised between −20 mm and +20 mm, cylinder has a value of less than 0.12 diopter.

4. The ophthalmic lens according to claim 1, wherein mean sphere is a decreasing function of y-axis coordinate on at least one vertical line of said lens, above the near vision reference point.

5. The ophthalmic lens according to one of claims 1 to 4, wherein a surface area defined by points having a distance from said geometrical center of less than 20 mm and for which a value of cylinder is comprised between said first and second values, is greater than 800 mm$^2$ when a difference $\Delta$ in mean sphere between said near vision reference point and said geometrical center of the lens is of the order of 0.60 diopter.

6. The ophthalmic lens according to claim 1, wherein said near vision reference point is located on said lens at less than 11 mm below said geometrical center of the lens.

7. The ophthalmic lens according to claim 1, wherein a surface area S defined by points having a distance of less than 20 mm from said geometrical center and for which a value of cylinder is comprised between said first and second values, is comprised between 780 and 880 mm$^2$.

8. The lens according to claim 1, wherein within a 8 mm diameter circle centered on said near vision reference point, cylinder at every point is less than 0.37 diopters.

9. The lens according to claim 1, wherein within a 8 mm diameter circle centered on said near vision reference point, variation in mean sphere is less than 0.25 diopters.

10. The ophthalmic lens according to claim 1, wherein an absolute value of gradient of mean sphere on said aspherical surface is less than the product of multiplying a constant $k_s$ by a difference 66 in mean sphere between said near vision reference point and said geometrical center of the lens, the value of said constant $k_s$ being comprised between 0.10 and 0.15 mm$^{-1}$.

11. The ophthalmic lens according to claim 10, wherein the value of said constant $k_s$ is equal to 0.14 mm$^{-1}$.

12. The ophthalmic lens according to claim 1, wherein an absolute value of gradient of cylinder on said aspherical surface is less than a product of multiplying a constant $k_c$ by a difference $\Delta$ in mean sphere between said near vision reference point and said geometrical center of the lens, said constant $k_c$ having a value comprised between 0.18 and 0.22 mm$^{-1}$.

13. The ophthalmic lens according to claim 12, wherein said constant has a value of 0.21 mm$^{-1}$.

14. The ophthalmic lens according to claim 1, wherein points of said aspherical face situated at a distance of less than 20 mm from said geometrical center and which are below a horizontal line situated 4 mm below said geometrical center of the lens have a cylinder that is less than said second value.

15. The ophthalmic lens according to claim 1, wherein lines defined by points on said aspherical face having a y-axis coordinate or vertical distance from said geometrical center of the lens greater than 8 mm, and for which cylinder is equal to said first value, are substantially parallel.

16. The ophthalmic lens according to claim 15, wherein said lines are substantially vertical.

17. The ophthalmic lens according to claim 4, wherein said vertical line passes through said geometric center.

18. The ophthalmic lens according to claim 6, wherein said near vision reference point is located on said lens at less than 10 mm below said geometrical center of the lens.

* * * * *

UNITED STATES PATENT AND TRADEMARK OFFICE
CERTIFICATE OF CORRECTION

PATENT NO. : 6,116,734
DATED : SEPTEMBER 12, 2000
INVENTOR(S) : CLAUDE PEDRONO, ET AL.

It is certified that error appears in the above-identified patent and that said Letters Patent is hereby corrected as shown below:

Column 8, claim 10, line 24:

delete: [66]
insert: -- Δ --

Signed and Sealed this

First Day of May, 2001

NICHOLAS P. GODICI

Attest:

Attesting Officer

Acting Director of the United States Patent and Trademark Office